3,405,150
POLYMERIZATION OF UNSATURATED FATTY ACIDS EMPLOYING A SYNTHETIC LITHIUM-MODIFIED MAGNESIUM SILICATE CATALYST
Sidney E. Miller, deceased, late of St. Paul, Minn., by Barbara B. Miller, executrix, St. Paul, Minn., and Donald H. Wheeler, Minneapolis, Minn., assignors to General Mills, Inc., a corporation of Delaware
No Drawing. Filed May 14, 1964, Ser. No. 367,920
15 Claims. (Cl. 260—407)

This invention relates to the polymerization of unsaturated fatty acids using a synthetic catalyst and in particular a synthetic lithium modified magnesium silicate catalyst It is an object of this invention to provide a novel synthetic catalyst for the polymerization of unsaturated fatty acids.

It is also an object of this invention to provide a process of polymerizing unsaturated fatty acids using a synthetic lithium modified magnesium silicate catalyst.

Briefly, the process of polymerization consists of heating the unsaturated fatty acids (an individual fatty acid or mixtures thereof, derived from oils or fats) at temperatures in the range of 160 to 280° C. in the presence of a lithium-magnesium silicate catalyst. Higher temperatures, up to about 300° C., may be employed if desired; however, there is generally no advantage in employing temperatures in excess of about 280° C.

The amount of catalyst employed is not particularly critical, the general range of catalyst from an economic standpoint being from about 5 to about 35% based on the weight of fatty acid feed. About 10-25% is preferred as this appears to provide optimum results. Amounts larger than 25% may be employed; however, such amounts may provide operational problems without appearing to provide any proportional benefits. Amounts below 5%, down to as low as 1%, are less economical and require extended heating periods.

The time of treatment will, of course, vary with the temperature used and the amount of catalyst employed; however, generally the time of treatment will vary from as low as 1 hour to as high as 8 hours. In general, about 4-6 hours are employed.

The polymerization may be conducted at atmospheric pressure or at elevated pressures. When elevated pressures are employed, the pressure is generally that generated by the presence of volatiles in the reaction mixture. If such volatiles naturally present are insufficient to provide the pressure desired, water may be added to the reaction system. In general the pressures generated will be on the order of 25 to in excess of about 250 p.s.i. Particularly at the low polymerizing temperatures and at low catalyst concentrations pressures as low as about 5 p.s.i. may be employed. When water is added to develop the desired pressure, it is generally not necessary to exceed 5% by weight based on the fatty acid feed employed. Under atmospheric pressure operation the reaction is conducted in the substantial absence of water unless some means is taken to retain the water and other volatiles.

After the polymerization step, the product is cooled to about 150° C. and then filtered to separate the clay catalyst. Prior to filtration, the product may be given various optional treatments in order to improve the color of the product. Since iron compounds are usually present in the clays, their reaction products with fatty acids usually introduce color bodies in the polymerized fatty acids. These may be removed by adding small amounts of phosphoric acid to the warm reaction product prior to filtration. The phosphoric acid is also needed to decompose any lithium soaps present. Decolorizing carbons and filter aids may also be added to assist in decolorizing and in filtration of the product.

After filtration, the filter cake is washed with a solvent to extract any fatty acid reaction products. The solvent is then removed by evaporation or distillation. Such solvents as hexane, heptane, or any of the lower boiling hydrocarbon solvents, may be used as extracting solvents, or the filter cake may be extracted with hot unpolymerized fatty acids such as those which are obtained as a byproduct from the polymerized fatty acids.

After filtration, the reaction product is stripped of any solvent which may have been used in the filtration process and is then distilled or stripped at low pressures on the order of 0.1 to 3 mm. The monomeric fatty acids are removed at temperatures in the range of up to 250–260° C. at 0.1 to 0.3 mm., leaving a residue of polymerized fatty acids consisting mainly of dimerized fatty acids and higher polymers plus small amounts of monomeric unpolymerized acids. The composition will vary, depending upon the polymerization conditions, temperatures and pressures, and temperatures used for distilling the reaction product. Normally, the compositions as determined by careful distillation at low pressures, will be about 5 to 10% monomeric fatty acids, 65 to 80% dimeric acids and 15 to 25% higher polymers. The monomer acids recovered in the distillation of the reaction product may be used for extracting the filter cakes obtained in subsequent polymerizations, thereby eliminating the use of hydrocarbon solvents which would require a separate and additional solvent recovery step.

The amounts of monomer (M), dimer (D) and trimer and residual higher polymeric forms (T) are determined by a micromolecular distillation method described in J.A.O.C.S., Paschke, R. F., Kerns, J. R. and Wheeler, D. H., Vol. 31, pages 5–7 (1954) using a micromolecular still with a quartz helix.

Any unsaturated higher fatty acid generally having from 8 to 22 carbon atoms may be employed in the present process. Illustrative of the ethylenically unsaturated acids are the branched, or straight chain, poly- or mono-ethylenically acids such as 3-octenoic acid, 10-undecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fatty acids may also be employed. Such acids, however, occur only rarely in nature and are expensive to synthesize. Accordingly, such are not currently of commercial significance. Illustrative straight or branched chain, mono- or poly-unsaturated acids of this type are 10-undecenoic acid, tariric acid, stearolic acid, behenolic acid and isamic acid.

Because of their ready availability and relative ease of polymerization, oleic and linoleic acids are the preferred starting materials for preparation of the polymeric fat acids. Of course, mixtures of fatty acids which in unsaturated acids may be used. These mixtures of acids may be derived from any common raw material ordinarily used as sources for unsaturated material. Soybean oil, linseed oil, cottonseed oil, safflower oil and fish oils are typical examples of such sources. Tall oil fatty acids may also be employed. Saturated material normally occurs associated with the unsaturated material. The saturated acids do not polymerize in the process described. However, separation of the saturated and unsaturated acids before polymerization is not necessary to the practice of the present invention and the polymerization may be carried out in the presence of the unreacted saturated acid. After polymerization, the unreacted material may, if desired, be removed and the product worked up in any conventional manner.

The catalyst composition is a synthetic lithium-magnesium silicate. By "synthetic" is meant "non-naturally occurring" and it is understood thereby that "naturally occurring" materials are excluded. Synthetic magnesium silicates may be prepared in any of the conventional manners and subsequently treated with the lithium compound. It is preferred, however, to form the magnesium silicate and simultaneously treat with the lithium compound by reacting a dispersion of silica and magnesium oxide and a lithium compound. This may be done by refluxing the silica, magnesia and the lithium compound in water at atmospheric pressure for extended periods of time. Generally this involves in excess of 3 hours, and preferably in excess of 8 hours. Time periods up to about 14 days have been employed. The reaction may also be conducted under elevated pressures by heating the catalyst ingredients in water under pressures of from about 100–500 p.s.i. at temperatures of about 200–600° C. for a period of from 2 to 6 hours. Higher pressures may be employed; however, as a practical matter they are unnecessary and resort thereto is made only occassionally. In general, time periods of 4–6 hours are preferred. While higher and lower temperatures may be employed, lower temperatures will require longer time periods while higher temperatures do not appear necessary.

In general any lithium compound, organic or inorganic, may be employed. Each lithium compound will differ to some degree in its effectiveness and in some cases, mixtures of two or more lithium compounds may be desirable. The preferred lithium compounds which may be employed alone or in admixture are:

(1) Salts of inorganic acids such as the lithium halides, e.g., lithium chloride and lithium fluoride.
(2) Lithium salts of organic carboxylic acids such as lithium acetate, propionate, caproate and stearate. In general the lithium salts of aliphatic hydrocarbon monocarboxylic acids having up to 22 carbon atoms may be employed.
(3) Lithium carbonate or hydroxide.

In the present process of polymerizing fatty acids when using only a single lithium compound in the catalyst, it appears that only lithium nitrate may not be entirely suitable from the standpoint of yield. In this process, both the sulfate and phosphate provide improved results. The nitrate may, however, be employed with admixture with one of the more suitable lithium compounds without seriously affecting results. When so employed, it is preferable that the lithium nitrate contributes no more than about 50% of the milliequivalents (meq.) of lithium employed when the preferred lithium levels are employed. As lower levels of lithium are employed, the level contributed by the nitrate is preferably lower, i.e. 10–30%.

Thus, in general, any lithium compound, organic or inorganic, other than solely lithium nitrate may be employed; and the nitrate may be employed, if used in admixture with other more suitable compounds, such as those previously indicated as preferred, and if the amount or level of the nitrate is kept below an interfering amount. By "interfering amount" is intended to mean that level or amount which cannot readily or preferably be tolerated without lowering the yield to below that obtained without the use of lithium. In summary, the catalyst is a synthetic magnesium silicate modified with lithium compounds other than interfering amounts of lithium nitrate.

The invention may perhaps best be illustrated by means of the examples below. In the examples, commercially available tall oil fatty acids (Pamak I) were employed as the feed material for polymerization, which have the following typical analysis:

| | |
|---|---|
| Acid value (A.V.) | 192–192.7 |
| Saponification value (S.V.) | 196–197.5 |
| Iodine value (I.V.) | 132.8–134 |
| Non-conjugated linoleic _____percent__ | 35.5 |
| Conjugated linoleic _____do___ | 6.7–7.1 |
| Saturated acids _____do___ | 1.7–3.5 |
| Rosin acids _____do___ | 1.2–1.5 |
| Unsaponifiables _____do___ | 1.6–2.1 |

The following specific procedures were employed in making the catalyst compositions.

Procedure A

To a beaker containing 1 liter of distilled water were added with stirring the Si and Mg components, i.e. colloidal aqueous $SiO_2$ and MgO, at levels shown in Table I. The mixture thickened and about another liter of distilled water was added. The mixture was thoroughly blended with a Waring Blendor and allowed to stand. The lithium component used was dissolved in about 200 ml. of $H_2O$ and added directly to the Si and Mg component mixture and stirred until well blened. The specific reaction for each run is described in the tables. The product obtained at this point was made slightly acidic to about pH 6 by adding dilute HCl and then filtered or evaporated directly without filtering. The residue was washed three times with distilled water if filtered. The residue was then dried in a draft over at 100–105° C. and then equilibrated 24 hours or more with moisture in the air.

Procedure B

This was identical with Procedure A except that the mixture was charged into an autoclave equipped with a stirrer and thermometer and run under the operating conditions indicated in the tables.

Procedure C

This was identical to B except that prior to adding the lithium compound the pH was adjusted to 9 and the crude magnesium silicate filtered and washed. The wet cake was then stirred with water and the lithium compound added.

The typical procedure used in the polymerization of the fatty acids is as follows:

Polymerization procedure

Into a reaction flask equipped with a stirrer and a short air cooled condenser (for atmospheric runs) or an autoclave (pressure runs) are placed the tall oil fatty acids and 15% of the synthetic catalyst based on weight of acid. The mixture is heated, with stirring, under a vacuum and the system flushed twice with nitrogen. Upon reaching the desired temperature, the reaction is maintained at this temperature for the predetermined length of time indicated. The reaction is then cooled to about 160° C. at which time phosphoric acid may be added to remove iron impurities. After then cooling and extraction with a paraffinic hydrocarbon solvent (Skellysolve B), the product is heated on a steam cone and filtered through an activated clay. It is then washed with acid ($HCl:H_2O:2:1$) followed by rinsing with distilled water to remove acid. The water was removed with $Na_2SO_4$, and the paraffinic hydrocarbon solvent removed by use of a flash evaporator under vacuum. The residue is distilled up to about 260° C. under vacuum. This residue is reported as "percent of yield of residue."

A number of catalyst compositions were prepared using the procedure, reactants and reaction conditions indicated in the following Table I.

TABLE I

| Example No. | Procedure Used | Reaction Materials | Reaction Conditions |
|---|---|---|---|
| 1 | A | 58 g. Mg(OH)$_2$, 90 g. SiO$_2$ (p.p.t. from MgCl$_4$ and SiCl$_4$) and 6.4 g. LiF. | Refluxed for about 14 days. |
| 2 | A | 116 g. Mg(OH)$_2$ (MgOH p.p.t. from MgCl$_2$), 180 g. Nalcoag 1035 and 13 g. of LiF. | Refluxed for about 10 days. |
| 3 | A | 80 g. MgO, 412 g. Nalcoag 1035 and 13 g. of LiF. | Refluxed for about 7 days. |
| 4 | A | 626 g. Sodium silicate, 406 g. of MgCl$_2$ (equals 233 g. Magnesium silicate) and 11.5 g. LiF. | Refluxed for about 6 days. |
| 5 | A | 340 g. of SiCl$_4$, 60 g. MgO [hydrolyzed to Mg(OH)$_2$] and 9.7 g. of LiF. | Refluxed about 3 hours. |
| 6 | A | 340 g. of SiCl$_4$, 60 g. MgO [hydrolyzed to Mg(OH)$_2$] and 9.7 g. of LiF. | Refluxed about 7 hours. |
| 7 | A | 340 g. of SiCl$_4$, 60 g. MgO [hydrolyzed to Mg(OH)$_2$] and 9.7 g. of LiF. | Refluxed for a total of 7 days. |
| 8 | A | 514 g. Nalcoag 1035 and 406 g. MgCl$_2$·6H$_2$O. | No refluxing, thoroughly mixed. |
| 9 | A | To portion of 8 above (about 164 g.) was added 10 g. LiF. | Refluxed 7 days. |
| 10 | A | 457 g. Nalcoag 1035, 80 g. MgO and 12.9 g. LiF. | Refluxed 8 days. |
| 11 | A | Took a portion of 10 and adjusted to pH 5.5 (HCl) and washed. | |
| 12 | A | Took a portion of 10 and adjusted to pH 5.5 (HCl) and washed. | |
| 13 | A | 530 Nalcoag 1034 and 90 g. MgO. | Thorough mixing. |
| 14 | A | To 5/6 of product above was added 12.2 g. LiF (Example 13 above). | Do. |
| 15 | A | A portion of 14 above was taken and refluxed. | Refluxed for about 7 days. |
| 16 | A | A portion of 15 above was treated with HCl to pH 6.0. | |
| 17 | A | 103.7 g. Silicic acid, 40 g. MgO, 6.4 g. LiF. | Thoroughly mixed. Refluxed for 3 hours. |
| 18 | A | A portion of 17 above was refluxed longer. | Refluxed for about 7 days. |
| 19 | A | 530 g. Nalcoag 1034, 90 g. MgO, 57 g. Li Acetate. | Refluxed 24 hours. |
| 20 | A | A portion of 19 above refluxed longer. | Refluxed 24 hrs. (total 48 hrs.). |
| 21 | A | 530 g. Nalcoag 1034, 90 g. MgO and 14.4 g. LiF. | Refluxed 24 hrs. |
| 22 | A | Portion of 21 above was refluxed longer. | Refluxed 24 hrs. (total 48 hrs.). |
| 23 | A | 530 g. Nalcoag 1034, 90 g. MgO and 57 g. Li acetate. | Thoroughly mixed. Refluxed 24 hrs. |
| 24 | A | A portion of 23 above refluxed longer. | Refluxed for total of 4 days. |
| 25 | A | 530 g. Nalcoag 1034, 90 g. MgO and 23.7 g. LiCl. | Refluxed for 24 hrs. |
| 26 | A | Portion of 25 above refluxed longer. | Refluxed for rotal of 4 days. |

NOTE.—Nalcoag 1034, Colloidal aqueous dispersion of SiO$_2$; 34% SiO$_2$, pH 3.1. Nalcoag 1035, Colloidal aqueous dispersion of SiO$_2$; 35% SiO$_2$, pH 8.6.

The catalyst compositions above were then employed as polymerization catalysts using the polymerization procedure previously described with the catalyst and reaction conditions indicated in the following Table II:

TABLE II

| Example No. | Catalyst Used Ex. No. of Table I | Reaction Conditions | | |
|---|---|---|---|---|
| | | Reaction Time, Hrs. | Temp., °C. | Pressure, p.s.i. |
| 27 | 1 | 4 | 215 | Atmospheric. |
| 28 | 1 | 4 | 215 | 15–36. |
| 29 | (¹) | 4 | 215 | Atmospheric. |
| 30 | 1 | 3 | 260 | 78–118. |
| 31 | 2 | 4 | 215 | Atmospheric. |
| 32 | 2 | 4 | 215 | 25 m. |
| 33 | 3 | 4 | 215 | 8–22. |
| 34 | 3 | 4 | 215 | Atmospheric. |
| 35 | 3 | 5 | 260 | 50–100. |
| 36 | 4 | 4 | 215 | Atmospheric. |
| 37 | 5 | 4 | 215 | Do. |
| 38 | 6 | 4 | 215 | Do. |
| 39 | 7 | 4 | 215 | Do. |
| 40 | 8 | 4 | 215 | Do. |
| 41 | 9 | 4 | 215 | Do. |
| 42 | 10 | 4 | 215 | Do. |
| 43 | 11 | 4 | 215 | Do. |
| 44 | 12 | 4 | 215 | Do. |
| 45 | 13 | 4 | 215 | Do. |
| 46 | 13 | 5 | 230 | 64–74. |
| 47 | 14 | 4 | 215 | Atmospheric. |
| 48 | 15 | 4 | 215 | Do. |
| 49 | 15 | 5 | 230 | 20–38. |
| 50 | 16 | 4 | 215 | Atmospheric. |
| 51 | 16 | 5 | 230 | 30–50. |
| 52 | 17 | 4 | 215 | Atmospheric. |
| 53 | 18 | 4 | 215 | Do. |
| 54 | 18 | 5 | 260 | 130–150. |
| 55 | 19 | 4 | 215 | Atmospheric. |
| 56 | 20 | 4 | 215 | Do. |
| 57 | 21 | 4 | 215 | Do. |
| 58 | 22 | 4 | 215 | Do. |
| 59 | 22 | 5 | 230 | 30–40. |
| 60 | 23 | 4 | 215 | Atmospheric. |
| 61 | 24 | 4 | 215 | Do. |
| 62 | 24 | 5 | 230 | 28–46. |
| 63 | 25 | 4 | 215 | Atmospheric. |
| 64 | 26 | 4 | 215 | Do. |

¹ 1 meq. of Li acetate/g. of magnesium silicate added.

The results of the polymerization can be seen from the following Table III:

TABLE III.—POLYMERIZATION RESULTS

| Example No. | Percent Yield of Residue | Analysis | | M | D | T | D/T Ratio |
|---|---|---|---|---|---|---|---|
| | | Sap. Value | Acid Value | | | | |
| 27 | 53.6 | 192 | 177 | 7.0 | 71.6 | 21.4 | 3.3 |
| 28 | 59.0 | 198 | 175 | 4.2 | 73.7 | 22.1 | 3.3 |
| 29 | 56.1 | 196 | 180 | 7.0 | 76.4 | 16.6 | 4.6 |
| 30 | 62.3 | 194 | 176 | 6.4 | 73.7 | 19.9 | 3.7 |
| 31 | 49.5 | 193 | 180 | 8.2 | 75.6 | 16.2 | 4.6 |
| 32 | 46.8 | 194 | 176 | 4.6 | 73.4 | 22.0 | 3.3 |
| 33 | 51.0 | 196 | 176 | 3.7 | 69.1 | 27.2 | 2.5 |
| 34 | 53.0 | 196 | 178 | 4.1 | 72.6 | 23.3 | 3.1 |
| 35 | 59.4 | 195 | 182 | 8.5 | 75.2 | 16.3 | 4.6 |
| 36 | 43.5 | 193 | 178 | 5.7 | 73.7 | 20.6 | 3.5 |
| 37 | 46.4 | 194 | 181 | 4.6 | 66.3 | 29.1 | 2.4 |
| 38 | 51.6 | 182 | 165 | 6.2 | 68.0 | 25.8 | 2.6 |
| 39 | 44.7 | 164 | 151 | | | | |
| 40 | 9.9 | | | | | | |
| 41 | 48.2 | 189 | 172 | 5.0 | 66.6 | 28.4 | 2.3 |
| 42 | 46.5 | 193 | 173 | 6.0 | 74.3 | 19.7 | 3.8 |
| 43 | 46.2 | 192 | 176 | | | | |
| 44 | 49.9 | 190 | 168 | 4.7 | 71.7 | 23.6 | 2.9 |
| 45 | 6.0 | | | | | | |
| 46 | 7.3 | | | | | | |
| 47 | 26.8 | 194 | 161 | | | | |
| 48 | 51.5 | 193 | 183 | 5.3 | 72.5 | 22.2 | 3.3 |
| 49 | 52.7 | 196 | 176 | 4.1 | 71.5 | 24.4 | 2.9 |
| 50 | 52.3 | 189 | 180 | 8.9 | 70.5 | 20.6 | 3.4 |
| 51 | 57.8 | 193 | 181 | 4.9 | 70.7 | 24.4 | 2.9 |
| 52 | 42.6 | 195 | 179 | 3.9 | 73.1 | 23.0 | 3.2 |
| 53 | 47.8 | 186 | 168 | 2.8 | 67.9 | 29.3 | 2.3 |
| 54 | 61.3 | 193 | 176 | 6.7 | 69.8 | 23.5 | 2.9 |
| 55 | 44.3 | 193 | 171 | 5.6 | 67.0 | 27.4 | 2.4 |
| 56 | 40.5 | 195 | 168 | 4.3 | 70.4 | 25.4 | 2.4 |
| 57 | 43.4 | 196 | 187 | 5.0 | 72.9 | 22.1 | 3.3 |
| 58 | 53.2 | 199 | 174 | 6.5 | 73.5 | 20.0 | 3.7 |
| 59 | 53.1 | 194 | 181 | 5.6 | 68.4 | 26.0 | 2.6 |
| 60 | 41.4 | 193 | 167 | 5.3 | 62.4 | 32.3 | 1.9 |
| 61 | 44.5 | 193 | 170 | 3.7 | 62.6 | 33.7 | 1.8 |
| 62 | 45.2 | 194 | 170 | 2.8 | 66.5 | 30.7 | 2.2 |
| 63 | 42.3 | 193 | 167 | 3.2 | 64.1 | 32.7 | 1.9 |
| 64 | 46.5 | 192 | 168 | 7.3 | 63.9 | 28.8 | 2.2 |

In the foregoing example all the catalyst compositions were prepared by Procedure A using reflux. A number of catalyst compositions were prepared by Procedures B and C using elevated pressures. The preparation thereof is summarized in the following Table IV.

TABLE IV.—CATALYST PREPARATION

| Ex. No. | Procedure | Reaction Materials | Reaction Conditions | | | Moisture in Product, Percent |
|---|---|---|---|---|---|---|
| | | | Time, Hrs. | Temp., °C. | Pressure, p.s.i. | |
| 65 | B | 3.0 Moles SiO₂ (530 g. Nalcoag 1034), 2.25 M MgO (90 g.) and 0.56 Li₂CO₃ (41.4 g.). | (a) 2 (b) 4 | 200 200 | 260 260 | 23.1 22.1 |
| 66 | B | 2.67 M SiO₂ (457 g. Nalcoag 1035), 2 M MgO (80 g.) and 0.52 M Li₂CO₃ (38 g.). | (a) 3 (b) 6 | 260 260 | 800 800 | 20.4 |
| 67 | B | Same as Example 66 above | 6 | 260 | 600 | 15.6 |
| 68 | B | 1.33 M Silicic Acid (103.7 g.), 1 M MgO (40 g.) and 0.25 M Li₂CO₃ (18.5 g.). This mixture did not gel as did the others. | 6 | 260 | 560 | 18.8 |
| 69 | B | Same as Example 66 above | 6 | 260 | 600 | [1] 19.4 |
| 70 | B | Same as Example 66 above | 6 | 285 | 1,000 | 14.2 |
| 71 | C | 1.3 M SiO₂ (280 g. Na₂SiO₃) 1 M MgO (40 g.) and 1 meq. of Li₂CO₃/g. of solids (4.44 g.). | 4 | 200 | 200 | 18.0 |
| 72 | C | Same as Example 71 above | 6 | 260 | 600 | 13.1 |
| 73 | C | 1.3 M SiO₂ (280 g. Na₂SiO₃), 1.0 M MgO (40 g.) and 1.0 meq. Li₂CO₃/g. of magnesium silicate (4.44 g.). | 4 | 200 | 200 | 11.8 |
| 74 | C | 1.3 M SiO₂ (280 g. Na₂SiO₃), 1.0 M MgCl₂ (2033 g.) and 1 meq. Li₂CO₃/g. of magnesium silicate (6.47 g.). | 4 | 200 | 200 | 8.5 |
| 75 | C | Example 74 above | 6 | 260 | 600 | 8.6 |
| 76 | B | 120 g. Magnesium Silicate (Celkate) (SiO₂=66.4% and MgO=16.6%) and 1 meq. Li₂CO₃/g. of magnesium silicate (4.44 g.). | 4 | 200 | 200 | 4.4 |
| 77 | B | Example 76 above | 6 | 260 | 600 | 3.4 |
| 78 | C | Example 73 above | 4 | 180 | 120 | 10.6 |
| 79 | C | Example 73 above | 4 | 230 | 400 | 7.0 |
| 80 | B | Example 76 above | 4 | 230 | 400 | 2.6 |
| 81 | C | 1.3 M SiO₂ (280 g. Na₂SiO₃), 1.0 M Mg (40 g.) and 0.03 M Li₂CO₃/1 M MgO (2.22 g.). | | | | |
| 82 | C | Example 81 above except 0.1 M Li₂CO₃ used (7.4 g.). | 4 | 200 | 200 | 10.9 |

[1] Neut HCl, 13.8 Neut HAc.

Using these above described catalysts, polymerizations were conducted using the procedure previously described with the catalyst and reaction conditions as set forth in the following Table V.

TABLE V

| Example No. | Catalyst Used Example No. | Reaction Conditions | | Pressure, p.s.i. |
|---|---|---|---|---|
| | | Time, hrs. | Temp., °C. | |
| 84 | 65(a) | 4 | 215 | Atmospheric. |
| 85 | 65(a) | 5 | 230 | 40–54. |
| 86 | 65(b) | 4 | 215 | Atmospheric. |
| 87 | 65(b) | 5 | 230 | 50–64. |
| 88 | 65(b) | 5 | 260 | 66–90. |
| 89 | 66(a) | 4 | 215 | Atmospheric. |
| 90 | 66(b) | 4 | 215 | Do. |
| 91 | 66(b) | 5 | 230 | 60–76. |
| 92 | 66(b) | 5 | 260 | 84–140. |
| 93 | 66(b) | 5 | 280 | 114–186. |
| 94 | 67 | 5 | 260 | 112–132. |
| 95 | 67 | 4 | 215 | Atmospheric. |
| 96 | 68 | 4 | 215 | Do. |
| 97 | 68 | 4 | 230 | Do. |
| 98 | 68 | 5 | 260 | 80–124. |
| 99 | 69 (Neut HCl) | 4 | 215 | Atmospheric. |
| 100 | 69 (Neut HCl) | 5 | 260 | 124–166. |
| 101 | 69 (Neut HAc) | 4 | 215 | Atmospheric. |
| 102 | 69 (Neut HAc) | 5 | 260 | 80–124. |
| 103 | 70 | 4 | 215 | Atmospheric. |
| 104 | 70 | 5 | 260 | 80–134. |
| 105 | 71 | 4 | 215 | Atmospheric. |
| 106 | 71 | 5 | 260 | 120–154. |
| 107 | 72 | 4 | 215 | Atmospheric. |
| 108 | 72 | 5 | 260 | 80–140. |
| 109 | 73 | 5 | 260 | 74–122. |
| 110 | 73 | 4 | 215 | Atmospheric. |
| 111 | 74 | 4 | 215 | Do. |
| 112 | 74 | 5 | 260 | 60–110. |
| 113 | 75 | 5 | 260 | 60–82. |
| 114 | 75 | 4 | 215 | Atmospheric. |
| 115 | 80 | 4 | 215 | Do. |
| 116 | 80 | 5 | 260 | 30–70. |
| 117 | 81 | 4 | 215 | Atmospheric. |
| 118 | 81 | 5 | 260 | 50–98. |
| 119 | 76 | 5 | 260 | 52–100. |
| 120 | 76 | 4 | 215 | Atmospheric. |
| 121 | 77 | 4 | 215 | Do. |
| 122 | 77 | 5 | 260 | 30–80. |
| 123 | 82 | 5 | 260 | 32–80. |
| 124 | 82 | 4 | 215 | Atmospheric. |
| 125 | 78 | 5 | 260 | 70–130. |
| 126 | 78 | 4 | 215 | Atmospheric. |
| 127 | 79 | 4 | 215 | Do. |

The results of the polymerization can be seen from the following Table VI.

TABLE VI

| Example No. | Percent Yield of Residue | Analysis | | M | D | T | D/T Ratio |
|---|---|---|---|---|---|---|---|
| | | Sap. Value | Acid Value | | | | |
| 84 | 52.1 | 194 | 176 | 4.9 | 71.3 | 23.8 | 3 |
| 85 | 48.1 | 196 | 175 | 4.9 | 71. | 24.1 | 3 |
| 86 | 58.0 | 194 | 181 | 5.4 | 71.3 | 23.3 | 3 |
| 87 | 52.5 | 197 | 180 | 4.8 | 71. | 24.2 | 2.9 |
| 88 | 58.4 | 194 | 181 | 4.7 | 74.4 | 20.9 | 3.6 |
| 89 | 56.1 | 180 | 178 | 7.4 | 69.8 | 22.8 | 3 |
| 90 | 56.8 | 195 | 183 | 6.3 | 76.3 | 17.4 | 4.4 |
| 91 | 59.1 | 197 | 183 | 4.3 | 76.9 | 18.8 | 4 |
| 92 | 67.1 | 197 | 186 | 5.8 | 80.3 | 13.9 | 5.8 |
| 93 | 63.7 | 194 | 178 | 10.2 | 79.2 | 10.6 | 7.5 |
| 94 | 67.0 | 197 | 186 | 7.8 | 75.2 | 17.0 | 4.4 |
| 95 | 55.3 | 191 | 182 | 7.8 | 73.4 | 18.8 | 4 |
| 96 | 57.0 | 195 | 183 | 5.2 | 76.6 | 18.2 | 4.2 |
| 97 | 55.3 | 189 | 183 | 9.2 | 73.9 | 16.9 | 4.4 |
| 98 | 63.2 | 197 | 184 | 6.2 | 79.0 | 14.8 | 5.3 |
| 99 | 54.2 | 190 | 179 | 7.4 | 73.6 | 19.0 | 3.9 |
| 100 | 67.7 | 198 | 184 | 7.5 | 79.5 | 13.0 | 6.1 |
| 101 | 53.3 | 188 | 178 | 8.0 | 75.4 | 16.6 | 4.5 |
| 102 | 66.9 | 198 | 180 | 6.8 | 80.8 | 12.4 | 6.5 |
| 103 | 52.1 | 189 | 177 | 8.8 | 73.9 | 17.3 | 4.2 |
| 104 | 67.3 | 198 | 182 | 7.3 | 78.0 | 14.7 | 5.3 |
| 105 | 60.7 | 194 | 180 | 6.9 | 73.4 | 19.7 | 3.7 |
| 106 | 70.7 | 197 | 185 | 8.8 | 72.8 | 18.4 | 4.0 |
| 107 | 56.8 | 191 | 177 | 7.6 | 72.9 | 19.5 | 3.7 |
| 108 | 65.3 | 197 | 184 | 6.7 | 73.9 | 19.3 | 3.3 |
| 109 | 66.7 | 195 | 179 | 4.2 | 71.3 | 24.5 | 2.9 |
| 110 | 64.3 | 191 | 182 | 5.2 | 71.6 | 23.2 | 3.0 |
| 111 | 54.4 | 195 | 178 | 5.3 | 68.9 | 25.8 | 2.7 |
| 112 | 59.7 | 191 | 178 | 6.7 | 71.2 | 22.1 | 3.2 |
| 113 | 63.7 | 194 | 181 | 7.2 | 72.8 | 20.0 | 3.6 |
| 114 | 60.2 | 191 | 174 | 5.2 | 70.3 | 24.5 | 2.8 |
| 115 | 53.3 | 195 | 176 | 5.1 | 68.1 | 26.8 | 2.5 |
| 116 | 60.6 | 195 | 177 | 3.6 | 75.9 | 20.5 | 3.7 |
| 117 | 55.3 | 194 | 175 | 5.7 | 70.2 | 24.1 | 2.9 |
| 118 | 58.4 | 193 | 185 | 6.3 | 73.6 | 20.1 | 3.6 |
| 119 | 63.9 | 195 | 180 | 5.2 | 72.8 | 22. | 3.3 |
| 120 | 59.2 | 194 | 175 | 4.4 | 69.9 | 25.7 | 2.7 |
| 121 | 59.7 | 191 | 174 | 5.8 | 70.9 | 23.3 | 3.1 |
| 122 | 62.5 | 194 | 179 | 4.3 | 75.9 | 19.8 | 3.8 |
| 123 | 60.6 | 192 | 179 | 3.7 | 73.3 | 23.0 | 3.2 |
| 124 | 54.0 | 195 | 177 | 4.1 | 70.3 | 25.6 | 2.8 |
| 125 | 62.5 | 192 | 178 | 5.1 | 70.6 | 24.3 | 2.9 |
| 126 | 59.0 | 191 | 176 | 5.0 | 66.7 | 28.3 | 4.4 |
| 127 | 59.8 | 193 | 186 | 3.4 | 68.5 | 28.1 | 2.4 |

In the following examples, the catalyst employed was prepared by Procedure B at 200° C. for 4 hours at a pressure of about 200 p.s.i. employing Na₂SiO₃, MgO and Li₂CO₃, unless otherwise indicated, at the Si to Mg and Li to Mg ratios indicated. For the polymerization, the catalyst was employed in an amount of 15% by weight based on the fatty acids at the conditions indicated. The results are as follows in Table VII.

TABLE VII

| Ex. | Si/Mg | Li/Mg | Temp. (°C.) | Time (Hrs.) | Pressure (p.s.i.) | D+T | D/T | S.V. | A.V. |
|---|---|---|---|---|---|---|---|---|---|
| 128 | 1.33 | No Li | 215 | 4 | Atmospheric | 41.8 | 3.0 | 191 | 168 |
| 129 | 1.33 | No Li | 260 | 5 | 146 | 42.2 | 2.6 | 192 | 169 |
| 130 | 1.33 | 0.12 | 215 | 4 | Atmospheric | 56.4 | 3.7 | 194 | 180 |
| 131 | 1.33 | 0.12 | 260 | 5 | 120-154 | 64.5 | 4.0 | 197 | 185 |
| 132 | 1.33 | 0.2 | 215 | 4 | Atmospheric | 59.7 | 2.4 | 193 | 186 |
| 133 | 1.33 | 0.2 | 260 | 5 | 32.8 | 60.1 | 3.4 | 190 | 177 |
| 134 | 1.33 | 0.12 | 215 | 4 | Atmospheric | 57.4 | 3.1 | 191 | 177 |
| 135 | 1.33 | 0.12 | 260 | 5 | 32-92 | 60.4 | 3.6 | 193 | 181 |
| 136 | 1.33 | 0.12 (LiNO$_3$) | 215 | 4 | Atmospheric | 14.0 |  | 187 | 154 |
| 137 | 1.33 | 0.12 (LiNO$_3$) | 260 | 5 | 52-98 | 29.2 | 2.8 | 190 | 159 |
| 138 | 1.33 | 0.12 (Li$_2$SO$_4$) | 215 | 4 | Atmospheric | 50.8 | 2.6 | 192 | 174 |
| 139 | 1.33 | 0.12 (Li$_2$SO$_4$) | 260 | 5 | 48-84 | 51.7 | 2.9 | 194 | 174 |
| 140 | 1.33 | 0.12 (Li$_3$PO$_4$) | 215 | 4 | Atmospheric | 52.2 | 2.6 | 187 | 171 |
| 141 | 1.33 | 0.12 (Li$_3$PO$_4$) | 260 | 5 | 42-102 | 57.0 | 3.4 | 193 | 177 |
| 142 | 0.70 | 0.12 | 215 | 4 | Atmospheric | 42.3 | 2.3 | 190 | 172 |
| 143 | 0.70 | 0.12 | 260 | 5 | 82-146 | 39.1 | 2.0 | 187 | 169 |
| 144 | 1.0 | 0.12 | 215 | 4 | Atmospheric | 53.4 | 3.6 | 193 | 183 |
| 145 | 1.0 | 0.12 | 260 | 5 | 60-156 | 61.0 | 4.1 | 196 | 185 |
| 146 | 1.0 | 1.4 | 215 | 4 | Atmospheric | 46.4 | 2.0 | 192 | 174 |
| 147 | 1.0 | 1.4 | 260 | 5 | 52-102 | 43.7 | 2.2 | 191 | 160 |
| 148 | 1.3 | 0.12 | 215 | 4 | Atmospheric | 57.4 | 3.1 | 191 | 177 |
| 149 | 1.3 | 0.12 | 260 | 5 | 36-92 | 60.4 | 3.6 | 193 | 181 |
| 150 | 1.3 | 0.06 | 215 | 4 | Atmospheric | 56.0 | 2.4 | 191 | 176 |
| 151 | 1.3 | 0.06 | 260 | 5 | 50-98 | 59.3 | 2.9 | 192 | 178 |
| 152 | 2.0 | 0.12 | 215 | 4 | Atmospheric | 53.5 | 2.4 | 190 | 170 |
| 153 | 2.0 | 0.12 | 260 | 5 | 52-102 | 58.6 | 3.6 | 191 | 177 |
| 154 | 4.0 | 0.12 | 215 | 4 | Atmospheric | 51.6 | 2.2 | 191 | 170 |
| 155 | 4.0 | 0.12 | 260 | 5 | 52-126 | 50.7 | 2.5 | 162 | 147 |

As can be seen from the foregoing data, a synthetic lithium modified magnesium silicate catalyst may be employed for the polymerization of unsaturated fatty acids. In the absence of the lithium treatment, the magnesium silicate catalyst is substantially inactive. However, modifying the catalyst with a lithium compound provides a significant unexpected increase in yield. This may be seen by comparing the yields provided in Examples 40 and 41 using catalyst compositions 8 (without lithium compound) and 9 (with LiF treatment), Examples 45 and 46 with 47, and Examples 128 and 129 with the subsequent examples illustrating the present invention.

The foregoing data also show that based on mole ratios, ratios of Li/Mg up to about 1.5 may be employed. In general a ratio of Li-Mg of at least 0.05 will be employed. The preferred range of Li/Mg would appear to be from 0.06 to about 0.5 with about 0.12 appearing to be optimum. Ratios of Si/Mg in excess of 4.0 may be employed although generally it is not necessary to exceed a ratio of 4.0. It is generally desirable to use a ratio of at least 0.70. Preferably a range of Si/Mg of from 1.0 to about 2.0 is employed with the optimum occurring about 1.3.

The embodiments of the invention in which an exclusive property or privilege is claimed are defined as follows:

1. A process of polymerizing unsaturated higher fatty acids comprising heating said fatty acids at polymerizing temperature in the range of 160 to about 300° C. in the presence of a synthetic lithium-magnesium silicate catalyst.

2. A process as defined in claim 1, in which said polymerizing temperature lies within the range of 160–280° C.

3. A process as defined in claim 1 which is conducted at atmospheric pressure.

4. A process as defined in claim 1 which is conducted at elevated pressures of from 5 to 250 p.s.i.

5. A process as defined in claim 1 in which said synthetic catalyst is employed in an amout of from 1 to 35% by weight based on said unsaturated fatty acids.

6. A process as defined in claim 1 in which said catalyst has an atomic ratio of Si to Mg in the range of from 0.7 to 4.0 and an atomic ratio of Li to Mg of from 0.05 to 1.5.

7. A process as defined in claim 1 in which said catalyst has an atomic ratio of Si to Mg of from 1.0 to 2.0 and an atomic ratio of Li to Mg of from 0.06 to 0.5.

8. A process as defined in claim 1 in which said catalyst has an atomic ratio of Si to Mg of about 1.3 and an atomic ratio of Li to Mg of about 0.12.

9. A process as defined in claim 1 in which said catalyst is prepared by heating under reflux at atmospheric pressure an aqueous dispersion of a magnesium silicate in the presence of a lithium compound, other than lithium nitrate in interfering amounts.

10. A process as defined in claim 1 in which said catalyst is prepared by heating at a temperature of from 200 to 260° C. at elevated pressures below 500 p.s.i. an aqueous dispersion of a magnesium silicate in the presence of a lithium compound, other than lithium nitrate in interfering amounts.

11. A process as defined in claim 9 in which said lithium compound is a lithium halide.

12. A process as defined in claim 9 in which said lithium compound is a lithium salt of a fatty acid.

13. A process as defined in claim 9 in which said lithium compound is lithium carbonate.

14. A process as defined in claim 9 in which said lithium compound is lithium acetate.

15. A process as defined in claim 9 in which said lithium compound is lithium hydroxide.

References Cited

UNITED STATES PATENTS 3,157,681  11/1964  Fischer _____ 260—407

NICHOLAS S. RIZZO, *Primary Examiner.*

R. J. GALLAGHER, *Assistant Examiner.*